United States Patent [19]
Takegawa

[11] 3,746,956
[45] July 17, 1973

[54] TAPE-READING CONTROL SYSTEM FOR REPEAT-PROCESSING CYCLES OF TRAVERSE CUTTING

[75] Inventor: Hiroyasu Takegawa, Kariya, Japan

[73] Assignee: Toyoda Koki Kabushiki Kaisha, Kariya-shi, Aichi-ken, Japan

[22] Filed: Apr. 2, 1971

[21] Appl. No.: 130,709

[52] U.S. Cl. .................. 318/572, 318/568, 318/579
[51] Int. Cl. ............................................. G05b 19/24
[58] Field of Search ..................... 318/579, 572, 568

[56] References Cited
UNITED STATES PATENTS
3,628,002  12/1971  Meese ............................ 318/572 X
3,573,586  4/1971   Littwin .............................. 318/579
3,605,531  9/1971   Izumi et al. ..................... 318/572 X
3,136,936  6/1964   Eisengrein ......................... 318/579

Primary Examiner—T. E. Lynch
Attorney—Oblon, Fisher & Spivak

[57] ABSTRACT

In a control system for grinding machines, the grinding operation is performed in a plurality of processing cycles, each of which is controlled according to command data stored in blocks on a tape. A sizing device is adapted to directly measure a workpiece diameter each time the processing cycles are individually accomplished. Every block of command data having a skip code or symbol at the first portion thereof is deleted by a sizing signal transmitted from the sizing device in a reading operation so that no more than the necessary number of processing cycles are carried out by the command data of the remaining blocks.

8 Claims, 10 Drawing Figures

INVENTOR
HIROYASU TAKEGAWA

BY *Chlon, Fisher, & Spivak*
ATTORNEYS

DIRECTION OF TAPE MOTION

TAPE-READING CONTROL SYSTEM FOR REPEAT-PROCESSING CYCLES OF TRAVERSE CUTTING

BACKGROUND OF THE INVENTION

1. Field of the Invention

The present invention relates to control devices for numerically controlled machine tools, and more particularly to an apparatus which controls repeat-processing cycles, such as traverse grinding, according to not only numerical information stored in a permanent record such as a punched tape, but also according to sizing signals transmitted from a sizing or measuring device.

2. Description of the Prior Art

In conventional grinding machines, traverse grinding is performed by alternating longitudinal or traverse strokes of a work table with a transverse stepping feed of a grinding wheel head, occurring at the ends of the traverse strokes of the table. The transverse grinding is controlled by a numerical control system in accordance with numerical information which is stored on a punched tape in the order in which the repeat processing traverse grinding operation is to occur. Although a workpiece may be finished to a desired size by a numerical control system alone, the employment of a sizing or measuring device may be helpful to finish the workpiece more accurately and more quickly. Therefore, there is a demand, for the aforementioned reasons, for a device which controls the diameter of a workpiece by using a sizing or measuring device together with a numerical control system. The sizing device serves to directly measure the workpiece diameter and to generate sizing signals by which the transverse feed is controlled or stopped, while the numerical control system is employed to control the alternate feed operations and other miscellaneous operations in accordance with punched numerical information. The command data for the alternate feed operations are individually recorded or stored in blocks on the tape in the order that the traverse grinding process is to be carried out. The command data remaining on the tape after the sizing signal is generated must be deleted during the repeat-processing operation, even if the processing cycle according to the punched information has not yet been completed.

SUMMARY OF THE INVENTION

It is, therefore, one object of the present invention to provide a control system which controls the reading of a tape, the tape having more command data blocks than are required to control a traverse cutting operation in its repeat-processing cycles.

It is another object of the present invention to provide a control system for causing a tape reader to skip the command data stored in unnecessary data blocks when a sizing signal is transmitted from a sizing device during the repeat-processing cycles of a traverse cutting operation.

Briefly, according to the present invention, these and other objects are achieved by providing a control system which comprises a work-supporting device, a tool-supporting device, a feed device for moving the work-supporting and the tool-supporting devices, and a numerical control device for controlling the feed device in accordance with command data so as to perform repeat processing cycles in a traverse cutting operation. Furthermore, a tape is provided with a plurality of data blocks thereon which may contain more data than the traverse cutting operation or other similar task may require. Each of the data blocks includes a block-end symbol for distinguishing each block from the other blocks and a skip symbol stored at the first column thereof. A tape reader reads the command data and passes it to the numerical control device. A sizing device measures the diameter of a workpiece each time each of the processing cycles is accomplished. A control device causes the tape reader to skip data blocks having a skip symbol when a proper sizing signal is transmitted from the sizing device, until the tape reader reads a block not having a skip symbol.

DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
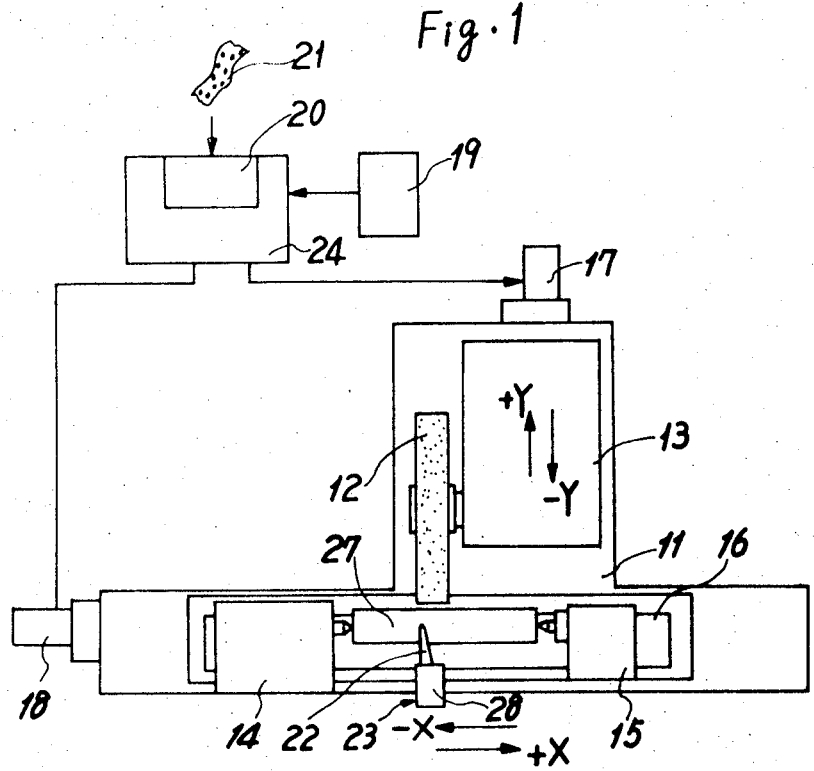
FIG. 1 is a top plan view schematically showing a grinding machine employing a numerical control system.

Referring now to the drawings wherein like reference numerals designate identical or corresponding parts throughout the several views, and more particularly to FIG. 1 thereof, wherein the present invention is schematically shown as including a machine comprised of a bed 11, a wheel head 13 slidably mounted on the bed 11 for rotatably carrying a grinding wheel 12, and a work table 16 on which a head stock 14 and a tail stock 15 are fixedly mounted to rotatably support a workpiece 27. The wheel head 13 may be transversely moved by a pulse motor 17 in either the +Y or −Y directions, as illustrated in FIG. 1, while the work table 16 may be longitudinally or transversely moved by a pulse motor 18 in either the +X direction or the −X direction. The pulse motors 17 and 18 are controlled by command pulses transmitted from a numerical control device 24 according to numerical information stored in a punched tape or equivalent record 21. The numerical control device 24 may also be manually operated through a control board 19. A sizing or measuring device 23 is slidably mounted on on the bed 11 so as to be moved in either the +Y or −Y directions and includes a pair of measuring feelers 22 and a sizing head 28 movably supporting the feelers 22. The feelers 22 may be advanced to a measuring position, wherein they are adapted to approach each other for embracing the workpiece 27 at opposite sides to measure the diameter or an equivalent parameter of workpiece 27. A further description of the sizing device 23 will not be given since such sizing devices are well known to those skilled in the art. However, such a device is disclosed in U.S. Pat. No. 3,568,372 dated Mar. 9, 1971, by Hiroaki Asano and Hideo Nishimura, and assigned to Toyoda Koki Kabu-shiki Kaisha.

Figure 2:
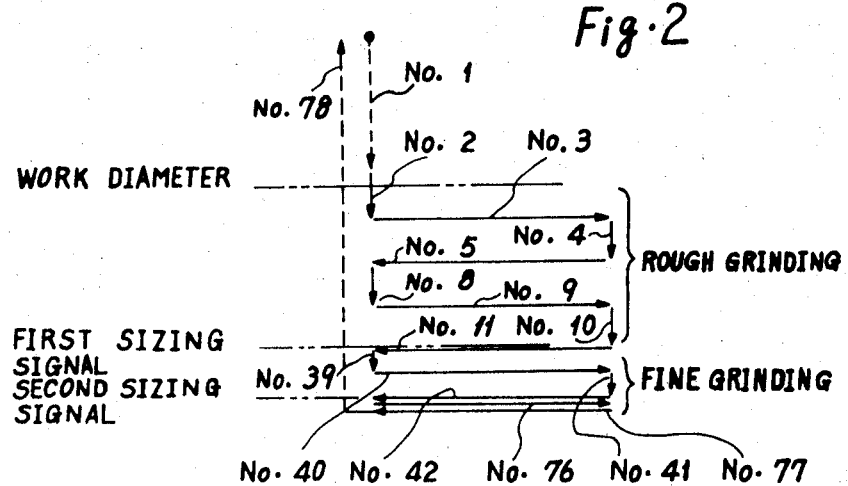
FIG. 2 is a cycle diagram of a traverse grinding operation.

In the aforementioned structure, the traverse grinding operation is performed in a well known manner such that the wheel head 13 is intermittently fed toward the workpiece each time the work table 16 reaches the end of its traverse movement or stroke, as schematically shown in the cycle diagram of FIG. 2.

rections. The relatively large cut is changed for a relatively small cut during each of step nos. 39 and 41, for example, to provide a finishing or fine grinding operation by a first sizing signal, which is generated by the sizing device 23 when the workpiece is ground to a size having a predetermined relationship to the desired finished size thereof. The small cut feed, which is rendered by the pulse motor 17, is stopped by a second sizing signal transmitted from the sizing device 23 when the work diameter reaches the desired finished diameter. Thereafter, the workpiece is ground only by longitudinal feed of work table 16 with wheel head 13 in a stopped condition (sparkout operation) and then the wheel head 13 is rapidly moved to a retracted or normal position in step no. 78.

A program sheet of the aforementioned traverse grinding process is illustrated below, wherein F.R. is short for "FEED RATE," D. short for "DIRECTION," F.A. for "FEED AMOUNT," M.F. for "MISCELLANEOUS FUNCTION", and P.C. for "PROCESSING CYCLE."

The "FEED AMOUNT" measurements are in millimeters and the slash marks (/) indicate "skip" signals.

PROGRAM SHEET

| P.C. | Data block number | F.R. | D. | F.A. | M.F. | CR | Remarks |
|---|---|---|---|---|---|---|---|
| | 1 | F99 | −Y | 5.000 | | CR | Rapid rate advancement of wheel head. |
| 1st | 2 | F10 | −Y | 0.050 | | CR | Cutting feed. |
| | 3 | F20 | X | 500.000 | M50 | CR | Dwell at transverse end (M50). |
| | 4 | F10 | −Y | 0.050 | | CR | |
| | 5 | F20 | −X | 500.000 | M50 | CR | |
| | 6 | | | | M60 | CR | Advancement of sizing device. |
| | 7 | | | | M61 | CR | Retraction of sizing device. |
| 2d | 8 / | F10 | −Y | 0.050 | | CR | |
| | 9 / | F20 | X | 500.000 | M50 | CR | |
| | 10 / | F10 | −Y | 0.050 | | CR | |
| | 11 / | F20 | −X | 500.000 | M50 | CR | |
| | 12 / | | | | M60 | CR | Advancement of sizing device. |
| | 13 / | | | | M61 | CR | Retraction of sizing device. |
| 3d | 14 / | (Hereunder, repetition of blocks from No. 8 to No. 13, each block including slash "/") | | | | | |
| 6th | 37 | | | | M61 | CR | Retraction of sizing device. |
| 7th | 38 | | | | M25 | CR | Block delete off. |
| | 39 | F10 | −Y | 0.001 | | CR | Cutting feed. |
| | 40 | F15 | X | 500.000 | M50 | CR | Dwell at transverse end (M50). |
| | 41 | F10 | −Y | 0.001 | | CR | |
| | 42 | F15 | −X | 500.000 | M50 | CR | |
| | 43 | | | | M60 | CR | Advancement of sizing device. |
| | 44 | | | | M61 | CR | Retraction of sizing device. |
| 8th | 45 / | F10 | −Y | 0.001 | | CR | |
| | 46 / | F15 | X | 500.000 | M50 | CR | |
| | 47 / | F10 | −Y | 0.001 | | CR | |
| | 48 / | F15 | −X | 500.000 | M50 | CR | |
| | 49 / | | | | M60 | CR | |
| | 50 / | | | | M61 | CR | |
| | | (Hereunder, repetition of blocks from No. 45 to No. 50, each block including slash "/") | | | | | |
| 12th | 74 | | | | M61 | CR | Retraction of sizing device. |
| | 75 | | | | M25 | CR | Block delete off. |
| | 76 | F15 | X | 500.000 | M50 | CR | Spark out. |
| | 77 | F15 | −X | 500.000 | M50 | CR | Do. |
| | 78 | F99 | Y | 5.500 | | CR | Retraction of wheel head. |

After the wheel head 13 has been advanced near to the workpiece at a rapid feed rate in step No. 1, it is advanced to provide relatively large cuts in each of step nos. 2, 4, 8 and 10, for roughly grinding the workpiece each time the work table 16 reaches the end of its longitudinal or traverse movements in the +X and −X directions.

Figure 3:
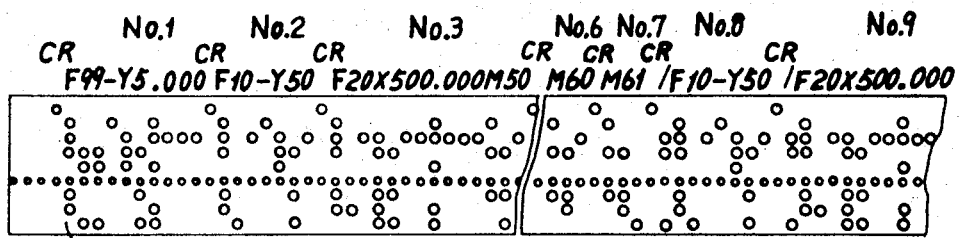
FIG. 3 shows fragmentally a punched tape storing command data for the traverse grinding operation.

The traverse grinding operation proceeds in the order of the numbers of blocks no. 1 to no. 78, inclusive. Each block includes command data comprising a skip, a feed rate, a direction, a feed amount, a miscellaneous function, and a block-end command to command one step of the grinding operation. The command data are recorded or punched in the order of the block numbers on the tape 21, as shown in FIG. 3, using a keyboard perforator or equivalent device (not shown) in a manner well known to those skilled in the art. In FIG. 3, typed symbols and block numbers are indicated above the punched tape 21, for convenience sake, in such a way that each of the typed symbols is indicated above a column in which a hole or holes are selectively provided to represent it.

The repeat-processing operation according to the command data will be described below with reference to the PROGRAM SHEET reproduced above and FIGS. 1 and 2.

According to the command data of block no. 1, the wheel head 13 is moved by the pulse motor 17 in the −Y direction at the feed rate corresponding to F99 (see program sheet) by a feed amount of 5.000 mm., as designated by no. 1 in FIG. 2, and is also moved in the −Y direction at a feed rate F10 by a feed amount 0.050 mm. according to block no. 2, as designated by no. 2 in FIG. 2. According to the command data of block no. 3, the work table 16 or workpiece 27 is moved by the pulse motor 18 in the +X direction at a feed rate F20 by a feed amount of 500.000 mm., as designated by no. 3 in FIG. 2. A dwelling operation commanded by a miscellaneous function command M50 is performed in a well known manner such that the work table 16 is stopped for a while at the right end of its longitudinal or traverse movement. As indicated by step no. 4 in FIG. 2, the wheel head 13 or the grinding wheel 12 is moved again by the pulse motor 17 in the −Y direction at the feed rate F10 by the feed amount 0.050 mm. according to the command data of block no. 4. In succession, according to block no. 5 the work table 16 is moved by the pulse motor 18 in the −X direction at the feed rate F20 by the feed amount 500.000 mm., as indicated by no. 5 in FIG. 2 and the dwelling operation is performed at its left stroke end in accordance with the command M50. During the dwelling operation, the measuring feelers 22 of sizing device 23 are moved to the measuring position according to a miscellaneous function command M60 in block no. 6 for directly measuring the diameter of workpiece 27, and are returned to their retracted or normal position according to a miscellaneous command M61 in block no. 7. As a result of this measurement, if the previously described first sizing signal is not transmitted from the sizing device 23, a second processing cycle is preformed according to blocks nos. 8 to 13, which is identical to the aforementioned first processing cycle according to block nos. 2 to 7, except for the presence of skip signals ("/"). These processing cycles provide for more rough grinding than is actually needed. For example, in the preferred instance, six processing cycles (1st to 6th, inclusive) are provided for rough grinding by data blocks nos. 2 to 37, inclusive. In these data blocks, with the exception of the blocks nos. 2 to 7 of the first processing cycle, slash or skip symbols "/" are provided at the first column of every data block for all cycles except the first cycle to prevent unnecessary processing cycles from being carried out by the command data of the blocks remaining after the first sizing signal has been generated. For example, when the first sizing signal is transmitted from the sizing device 23 after the sizing operation according to blocks nos. 12 and 13, the command data of blocks no. 14 to 37 inclusive, for the processing cycles following the second processing cycle are deleted by a control circuit 25 (FIGS. 4 and 5) in an operation which will be described in detail hereinafter. The block-delete operation described above is stopped by a miscellaneous function command M25 of block no. 38.

Similarly, for fine grinding, the blocks nos. 39 to 74, inclusive, form six processing cycles (7th to 12th, inclusive), wherein skip signs are provided at the first column of every block with the exception of the blocks for the 7th processing cycle. In fine grinding, the work table 16 is moved by the pulse motor 18 at a feed rate corresponding to F15, after the wheel head 13 is moved by a feed amount 0.001 mm. After a block-delete operation similar to that in the rough grinding cycle, a spark-out operation, well known to those skilled in the art, is performed according to the command data of block nos. 76 and 77. Last of all, the wheel head 13 is returned to its retracted or normal position at the feed rate F99. Thus, the transverse grinding is performed in accordance with the numerical information on the program sheet.

A control device will now be described which performs the aforementioned transverse grinding by command data or information contained in punched tape 21 and by sizing signals generated by sizing device 23.

Figure 4:
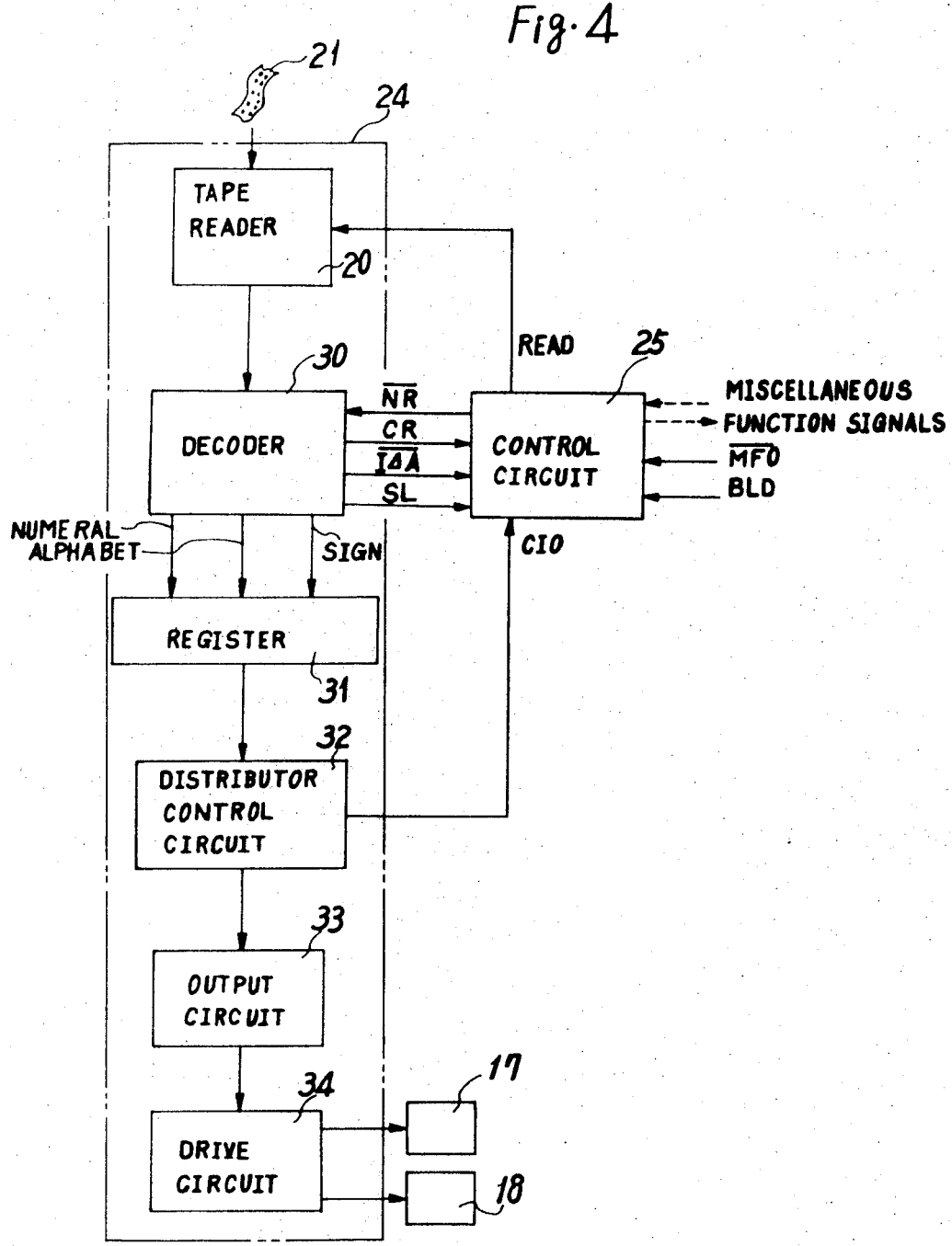
FIG. 4 is a block diagram illustrating the control of the grinding machine according to the command data.

Referring now to FIG. 4, a whole control system is shown in the form of a block diagram. The information in command tape 21 is read by a tape or equivalent record reader 20. A decoder 30 discriminates among numerical values, alphabetical characters, symbols and the like, and reads the decoded information into a buffer or storage register 31. A control circuit 25 controls start, stop and aforementioned skip operations of the tape reader, presently to be described in detail. The control circuit 25 is responsive to the following signals: a block-end signal CR, and alphabet signal $\overline{I \Delta A}$ and a slash signal "/" or SL, all of which have been processed in the decoder 30. Control circuit 25 is also responsive to a block-delete signal $\overline{BLD}$, a miscellaneous function $\overline{MFO}$, and a pulse distribution completion signal CIO. Numeral 32 indicates a pulse distributor circuit which generates pulses corresponding to the amount of feed and the feed rate which are commanded by tape 21. An output control circuit 33 serves to select pulse motors 17 and 18 and to select the plus and minus directions by change-over gates therein, not shown. Numeral 34 is a drive circuit which rotates pulse motors 17 and 18 in response to pulse signals transmitted therefrom for moving the work table 16 and the wheel head 13. The tape reader 20, decoder 30, register 31, distributor control circuit 32, output circuit 33, and the drive circuit 34 have been shown and described above in brief since these components are well known to those skilled in the art. For purposes of this disclosure it is sufficient to say that these components are as contained in a conventional numerical control system manufactured by Fujitsu Ltd., Kawasaki, Japan and sold as FANUC MODEL 260.

The control circuit 25 will now be described in detail with reference to a preferred circuit embodiment illustrated in FIG. 5, wherein are shown logic control circuits which comprise NAND gates or circuits designated by numerals 50 to 61, inclusive and characterized by a function whose output is low (0) only if all inputs are high (1). Control circuit 25 also includes an inverter circuit 49, providing a complement function, flip-flop circuits FF1, FF2, and FF3 individually constructed by interconnection of two NAND circuits or NAND gates, and differential circuits DIF1 and DIF2 constructed individually by the connection of two NAND gates and a condenser. A detailed description of the flip-flop circuits will not be given since such flip-flop circuits are well known to those skilled in the art and are described in detail in "Logic Design with Integrated Circuits," by William E. Wickes and published by John Wiley & Sons, Inc.

Operative conditions will now be described for the above described circuit.

Figure 5:
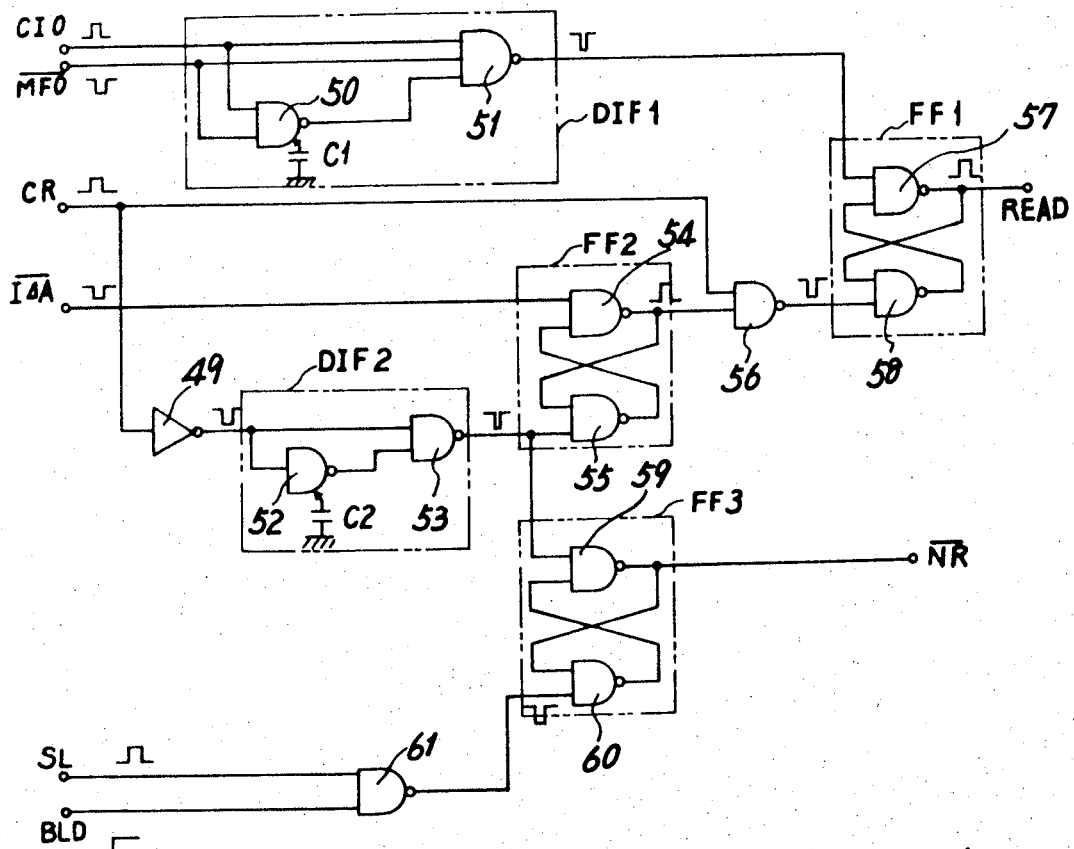
FIG. 5 shows a logic block diagram illustrating a system for controlling a tape-reading operation.

In FIG. 5, the starting condition of tape reader 20 is such that a 1 output initially appears at the terminal labeled READ. In other words, a high or 1 output appears at the output terminal of NAND circuit 57, since a low input or 0 input is applied to the input terminals thereof. To apply a 0 input to the NAND circuit 57, a terminal CIO applies a 1 state due to completion of pulse distribution, and then a terminal $\overline{MFO}$ applies a a 1 state when a miscellaneous function is performed, so that a negative differential pulse or low input pulse appears at the output terminal of NAND circuit 51 to switch flip-flop FF1 to its 1 state.

Figure 6A:
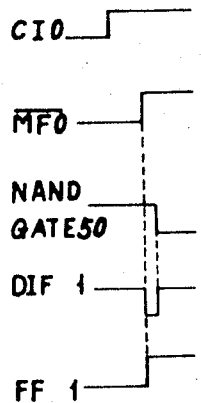
FIG. 6A shows the relationship between different voltages at strategic points in FIG. 5 with respect to the start of the tape-reading operation.

The operation of the differential circuit DIF 1 is not explained in detail since such circuits are per se well known to those skilled in the art. For present purposes, suffice it to say that since the 1 output of NAND gate 50 is delayed by the delay function of a condenser C1, a 0 output appears at the output terminal of NAND circuit 51 and thus at the output of differential circuit DIF 1 for a short time determined by the capacitance of of condenser C1. Then, the differential circuit DIF 1 switches to its 1 state the moment the NAND gate 50 switches to its 0 state, as shown in FIG. 6A. Thus, a negative differential pulse is transmitted from the differential circuit DIF 1.

Figure 6B:
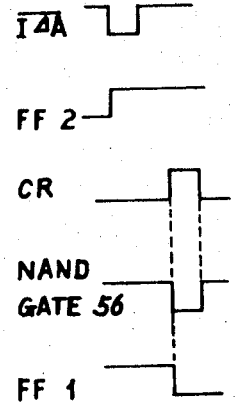
FIG. 6B shows the relationship between different voltages at strategic points in FIG. 5 with respect to the stop of the tape-reading operation.

The stop condition of tape or record reader 20 occurs when a 0 output appears at the READ terminal. In other words, the flip-flop circuit FF1 must be reset to its 0 state so that a 0 output may appear at the output terminal of NAND circuit 57, since a negative pulse or 0 input is applied to the input terminal of NAND circuit 58. In order to apply a 0 input to NAND circuit 58, terminal $\overline{I\Delta A}$ must switch to its 0 state when the tape reader 20 reads alphabetical symbols contained in the first portion of each block of punched tape 21, as shown in FIG. 3. This sets flip-flop FF2 which includes NAND circuits 54 and 55, through negative pulses, causing a 1 output to appear at the output terminal of NAND circuit 54, which is also the output of flip-flop FF2. Since the terminal CR switches to its 1 state when block-end symbol CR is read by the tape reader 20, a 0 output appears at the output terminal of NAND circuit 56, thereby resetting flip-flop FF1, as shown in FIG. 6B.

The terminal READ is thereby reset to its 0 state to stop the reading operation of tape reader 20. A normal reading operation is stopped each time the command data of individual data blocks has been read by the tape reader 20, which then starts its operation to again read the instructions of the next data block after the completion of the operation dictated by the previous command data. Thus, the predetermined operations are continuously performed by the alternate repetition of starting and stopping in accordance with a programmed operation-order, as described above.

Figure 6C:
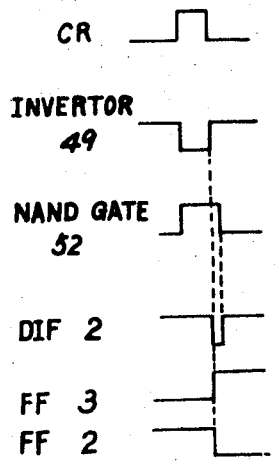
FIG. 6C shows the relationship between different voltages at strategic points in FIG. 5 in case a negative differential pulse is generated thereby switching flip-flop FF3 to its 1 state and switching flip-flop FF2 to its 0 state.

The skip condition of tape reader 20 occurs when a 0 input is not applied to the input terminal of NAND circuit 58 even if the output terminal CR switches to its 1 state to stop the reading operation of tape reader 20. Therefore, the flip-flop FF2 which is in its 1 state, since an alphabetical symbol has been read, must be switched to its 0 state to prevent application of a 1 input to the input terminal of NAND circuit 56. To switch the flip-flop FF2 to its 0 state, a negative pulse or 0 input is applied to the input terminal of NAND circuit 55 when a 1 input is applied to the terminal CR. The moment the output of inverter 49 switches to its 1 state, a negative differential pulse is produced by the cooperation of inverter 49 and differential circuit DIF 2, thus resetting the flip-flop FF2 to its 0 state as shown in FIG. 6C. The negative differential pulse is also simultaneously applied to the input terminal of NAND circuit 59 of flip-flop FF3 so as to set flip-flop FF3, whereby a 1 input appears at terminal $\overline{NR}$. The signal transmitted from the terminal $\overline{NR}$ is applied to decoder 30 as a gate-operating signal. While the terminal NR is in its 0 state, the gate of decoder 30 is closed not so as to act upon input information even if input information from tape 21 is read by tape reader 20. Accordingly, in this case, the flip-flop FF2 is still in its reset condition, since the value of terminal $\overline{I\Delta A}$ does not switch to its 0 state, so that the tape reader 20 may skip some of the data blocks on tape 21.

Figure 6D:
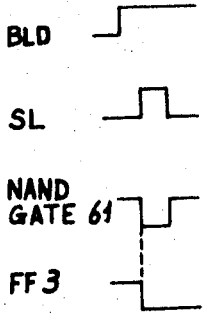
FIG. 6D shows the relationship between differential voltages at strategic points in FIG. 5 when flip-flop FF3 is switched to its 0 state.

The condition for starting the skip operation (closing the gate of decoder 30) is that the value at terminal $\overline{NR}$ is a 0 state, i.e., the flip-flop FF3 is reset to its 0 state. In order to reset the flip-flop FF3, 1 inputs are applied to both terminals BLD and SL and then a 0 output appears at the output terminal of NAND circuit 61 as shown in FIG. 6D. In other words, when the tape reader 20 reads the slash symbol under an "ON" signal for a block-delete signal (terminal BLD in a 1 state) which is commanded by a relay R100 (FIG. 7) energized by the sizing signal transmitted from sizing device 23, as described hereinafter, a 0 output is applied to the input terminal of NAND circuit 60 thereby switching the flip-flop circuit FF3 to its 0 state, as shown in FIG. 6D. The reset condition of flip-flop FF3 is maintained until the block-end symbol CR on tape 21 is read by tape reader 20. When the output at terminal CR is switched to a 1 state, a negative differential pulse is applied to the input terminal of NAND circuit 59 thereby setting the flip-flop circuit FF3 to its 1 state. So long as the block-delete signal remains in its 1 state, however, the flip-flop FF3 is again reset to its 0 state when tape reader 20 reads slash symbols in the first column of program blocks on tape 21, whereby the program block having the slash symbol is skipped.

The condition for stopping the skipping operation (opening the gate of decoder 30) is that the value at terminal $\overline{NR}$ is switched to its 1 state. In other words, the flip-flop FF3 is not permitted to be reset when the block-delete signal is in its OFF state and a particular program block read by the tape reader 20 does not have a slash symbol therein. Thereby, since the signal for opening the gate of decoder 30 (terminal $\overline{NR}$ in its 1 state) is generated by the flip-flop FF3 which is set to its 1 state when a 1 output appears at the CR terminal, the alphabetical symbol indicated in the program block may be decoded to switch terminal $\overline{I\Delta A}$ to its 0 state whereby the flip-flop FF2 switches to its 1 state. Thereafter, when a 1 input is applied to terminal CR, the flip-flop FF1 is reset to switch the READ terminal to its 0 state thereby stopping the reading operation of tape reader 20.

Figure 7:
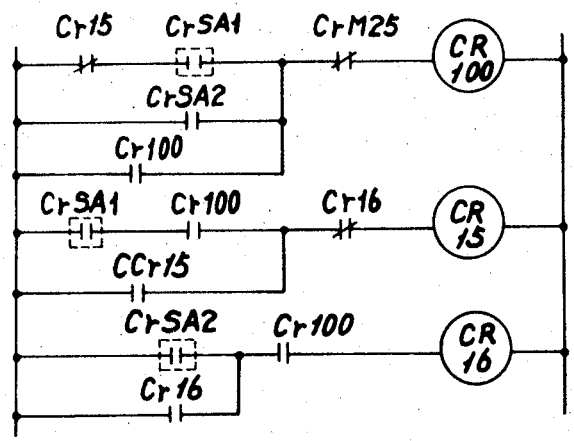
FIG. 7 is a schematic diagram of a relay circuit for commanding a block delete operation.

A block delete circuit will now be described with reference to FIG. 7, wherein CR 100 indicates a relay for instructing a block-delete operation, CR15 indicates a relay for storing the first sizing signal, R16 indicates a relay for storing the second sizing signal, CrSA1 indicates a contact closed by the first sizing signal, and CrSA2 indicates a contact closed by the second sizing signal. A normally open contact CCr15 of relay CR15 is closed upon energization thereof after which time a normally closed contact Cr15 is opened. When the contact CrSA1 is closed, the relay CR100 is energized and the energization thereof is held by its self-hold contact Cr100 to produce a block-delete "ON" signal, thus switching the terminal BLD to its 1 state. Thereby, the program block having the slash symbol is skipped due to a 1 output appearing at the terminal SL during the reading operation of tape reader 20. The de-energization of relay CR100 is instructed by the miscellaneous function M25 according to the tape command and is performed by the opening of a normally closed contact CrM25. When the relay CR15 is energized by the first sizing signal, the normally closed contact Cr15 is opened, so that the relay CR100 may not be energized even if the normally opened contact CrSA1 is closed. When the contact CrSA2 is closed by the second sizing signal transmitted from the sizing device 23, the relay CR100 is energized again to produce a block-delete "ON" signal, thereby skipping the programmed command for the fine grinding operation. The de-energization of relay CR100 is instructed by the miscellaneous function M25, and is implemented by the opening of normally closed contact CrM25. When the second sizing signal is transmitted by the sizing device 23, the relay CR16 is energized to de-energize the self-holding relay CR15. The relay CR16 is de-energized when the contact Cr100 is opened by the block-delete "OFF" signal.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An improved system for controlling the repeat-processing cycles of a machine tool operating on a workpiece comprising;
   record means containing a plurality of data blocks thereon for controlling the operation of said machine tool, said record means containing more data blocks for the repeat-processing cycles and having skip signs therein than is needed by said machine tool to complete a specific task;
   record reading means for reading command data of said data blocks contained in said record means and for supplying operating instructions to said machine tool in response thereto;
   sizing means for measuring at least one parameter of said workpiece, said sizing means generating an output signal when said parameter measurement corresponds to a predetermined value thereby indicating that said task has been completed; and
   record-reading control means coupled to said sizing means and to said record reading means for causing said record reading means to skip the command data of selected additional data blocks contained in said record means relating to said task upon receipt of said output signal from said sizing means when said record reading means reads said skip signs.

2. An improved system for controlling the repeat processing cycles of a machine tool operating on a workpiece as in claim 1, wherein said record-reading control means comprises:
   first circuit means coupled to said record reading means for starting said record reading means;
   second circuit means coupled to said first circuit means for causing said first circuit means to stop said record reading means in response to the reading of appropriate data by said record reading means; and
   third circuit means for causing the command data of said additional data blocks to be skipped in response to generation of said output signal and reading said skip signs, and for resetting said circuit means.

3. An improved system for controlling the repeat-processing cycles of a machine tool operating on a workpiece as in claim 2, wherein:
   said first circuit means comprises a first differential circuit; and
   a first flip-flop circuit coupled to said first differential circuit.

4. An improved system for controlling the repeat-processing cycles of a machine tool operating on a workpiece as in Claim 3, wherein:
   said second circuit means comprises a second flip-flop circuit,
   a first gate means coupled to said first and second flip-flop circuits; and,
   a second differential circuit coupled to said second flip-flop circuit.

5. An improved system for controlling the repeat-processing cycles of a machine tool operating on a workpiece as in claim 4, wherein:
   said third circuit means comprises a third flip-flop circuit coupled to said second flip-flop circuit; and,
   second gate means coupled to said third flip-flop circuit.

6. An improved system for controlling the repeat-processing cycles of a machine tool operating on a workpiece as in claim 5, wherein:
   said first circuit means comprises a first differential circuit; and,
   a first flip-flop circuit coupled to said first differential circuit.

7. An improved system for controlling the repeat-processing cycles of a machine tool operating on a workpiece comprising:
   record means containing a plurality of data blocks individually discriminated by block-end signs thereon for controlling the operation of said machine tool, said record means containing more data blocks for the repeat-processing cycles and having skip signs therein than is needed by said machine tool to complete a specific task;
   record reading means for reading command data of said data blocks and for supplying operating instructions to said machine tool in response thereto;
   sizing means for measuring at least one parameter of said workpiece each time each of said repeat-processing cycles is accomplished, said sizing means generating an output signal when said parameter measurement corresponds to a predetermined value thereby indicating that said task has been completed; and record-reading control means coupled to said sizing means and to said record reading means for causing said record reading means to skip the command data of selected additional data blocks having said skip signs in response to generation of said output signal and reading said skip sign until said record reading means reads the data block not having said skip sign.

8. An improved system for controlling the repeat-processing cycles of a machine tool operating on a workpiece as in claim 7, wherein said record-reading control means comprises:

first circuit means connected to said record reading means for starting the operation of the same;

second circuit means coupled to said first circuit means and set by the command data read by said record reading means for causing said first circuit means to stop the operation of said record reading means when said record reading means reads said block-end signs; and third circuit means for cancelling the command data of said additional data blocks having said skip signs when said record reading means reads said skip signs during the generation of said output signal so as to make said second circuit means reset.

* * * * *